United States Patent
Michaelis De Vasconcellos et al.

(10) Patent No.: US 11,021,602 B2
(45) Date of Patent: Jun. 1, 2021

(54) ABS MOLDING COMPOSITION HAVING IMPROVED CRACK AND CHEMICAL RESISTANCE AND ITS USE

(71) Applicant: INEOS STYROLUTION GROUP GMBH, Frankfurt am Main (DE)

(72) Inventors: Janna Michaelis De Vasconcellos, Sprockhoevel (DE); Norbert Niessner, Friedelsheim (DE); KwanHee Lee, Ulsan (KR); Gisbert Michels, Leverkusen (DE)

(73) Assignee: INEOS STYROLUTION GROUP GMBH, Frankfurt am Main (DE)

(*) Notice: Subject to any disclaimer, the term of this patent is extended or adjusted under 35 U.S.C. 154(b) by 0 days.

(21) Appl. No.: 16/094,650

(22) PCT Filed: Apr. 18, 2017

(86) PCT No.: PCT/EP2017/059150
§ 371 (c)(1),
(2) Date: Oct. 18, 2018

(87) PCT Pub. No.: WO2017/182452
PCT Pub. Date: Oct. 26, 2017

(65) Prior Publication Data
US 2019/0119487 A1    Apr. 25, 2019

(30) Foreign Application Priority Data

Apr. 21, 2016 (EP) .................................. 16166327

(51) Int. Cl.
| | | |
|---|---|---|
| *C08F 212/04* | (2006.01) | |
| *C08L 51/04* | (2006.01) | |
| *C08F 212/10* | (2006.01) | |
| *C08L 55/02* | (2006.01) | |
| *C08F 279/04* | (2006.01) | |
| *C08L 25/12* | (2006.01) | |
| *B29C 48/00* | (2019.01) | |
| *C08F 220/44* | (2006.01) | |
| *C08K 3/26* | (2006.01) | |
| *C08K 3/34* | (2006.01) | |
| *C08L 23/08* | (2006.01) | |
| *F25D 23/06* | (2006.01) | |
| *B29K 55/02* | (2006.01) | |

(52) U.S. Cl.
CPC ............ *C08L 51/04* (2013.01); *B29C 48/022* (2019.02); *C08F 212/10* (2013.01); *C08F 220/44* (2013.01); *C08F 279/04* (2013.01); *C08K 3/26* (2013.01); *C08K 3/34* (2013.01); *C08L 23/0869* (2013.01); *C08L 25/12* (2013.01); *C08L 55/02* (2013.01); *B29K 2055/02* (2013.01); *C08F 2500/01* (2013.01); *C08F 2500/12* (2013.01); *C08F 2800/20* (2013.01); *C08K 2003/265* (2013.01); *C08L 2205/02* (2013.01); *C08L 2205/025* (2013.01); *C08L 2205/03* (2013.01); *C08L 2205/035* (2013.01); *F25D 23/066* (2013.01)

(58) Field of Classification Search
CPC ....................................................... C08L 55/02
See application file for complete search history.

(56) References Cited

U.S. PATENT DOCUMENTS

| | | | |
|---|---|---|---|
| 3,350,372 A | 10/1967 | Anspon et al. | |
| 6,323,279 B1 | 11/2001 | Guntherberg et al. | |
| 6,531,543 B1 * | 3/2003 | Guntherberg | ......... C08F 265/04 |
| | | | 525/70 |
| 6,579,937 B1 | 6/2003 | Guntherberg et al. | |
| 7,060,741 B2 | 6/2006 | Eichenauer et al. | |
| 2008/0093578 A1 | 4/2008 | Park et al. | |
| 2013/0274378 A1 | 10/2013 | Muller et al. | |
| 2014/0190978 A1 | 7/2014 | Bowman et al. | |

FOREIGN PATENT DOCUMENTS

| | | | | |
|---|---|---|---|---|
| CN | 1334846 A | | 2/2002 | |
| CN | 101864140 A | | 10/2010 | |
| CN | 101970570 A | | 2/2011 | |
| CN | 102822269 B | | 12/2014 | |
| DE | 1260135 B | | 2/1968 | |
| EP | 0993476 A1 | | 4/2000 | |
| EP | 0993476 B1 | | 2/2002 | |
| GB | 1124911 A | | 8/1968 | |
| JP | H0841285 A | | 2/1996 | |
| JP | 11269338 A | * | 10/1999 | |
| KR | 20060131373 B1 | | 12/2006 | |
| KR | 100665804 B1 | | 1/2007 | |
| KR | 20150067478 A | * | 6/2015 | |
| WO | 2001/062848 A1 | | 8/2001 | |
| WO | 2012/022710 A1 | | 2/2012 | |
| WO | WO-2014175132 A1 | * | 10/2014 | ............. A63B 45/00 |

* cited by examiner

*Primary Examiner* — Mark S Kaucher
(74) *Attorney, Agent, or Firm* — J.A. Lindeman & Co. PLLC

(57) ABSTRACT

Thermoplastic molding composition scan be advantageously used in hydrofluoro olefin containing areas, comprising components A, B, C and, D: 10 to 35 wt.-% ABS graft rubber A obtained by emulsion polymerization, 50 to 75 wt.-% SAN copolymer B, 4 to 20 wt.-% copolymer C from ethylene and $C_1$-$C_6$-alkyl(meth)acrylate, and 4 to 20 wt.-% ABS graft rubber copolymer D obtained by mass polymerization.

16 Claims, No Drawings

ABS MOLDING COMPOSITION HAVING IMPROVED CRACK AND CHEMICAL RESISTANCE AND ITS USE

The invention is directed to ABS molding compositions that exhibit improved environmental stress crack resistance properties in the presence of olefinic unsaturated blowing agents, such as hydrofluoro olefins (HFO). The invention further deals with their use in hydrofluoro olefin containing areas and as inner liner in cooling apparatuses.

For thermoformed equipment liners e.g. of refrigerators, styrene copolymers, and in particular ABS resins are often the material of choice for their balance of properties: strength, toughness (impact resistance), appearance (gloss and color), chemical resistance, processability, and price. Sheet extrusion grades of ABS provide deep draw capability for thermoforming operations, strength and toughness for durability in assembly and use, high gloss, stain and chemical resistance to items such as food.

Document KR-A 2006131373 describes a heat resistant ABS molding composition comprising from 20 to 35 parts by weight of an ABS graft rubber (A), 0.1 to 10 parts by weight of an ethylene-alkyl(meth)acrylate copolymer (e.g. Elvaloy® AC) (B) and 84.9 to 55 parts by weight of a mixture (C) of two SAN copolymers (c1(long chain) and c2 (branched), AN content 20% by weight (wt.-%), each). The ABS polymer blend is used for outdoor applications (automobile parts, building materials etc.) and has an improved chemical and crack resistance against insecticides and cleaning agents. The application of the ABS polymer composition in cooling apparatuses is not addressed.

The refrigeration industry uses polyurethane foam for heat insulation between the outer metal cabinet and the inner plastic liner. The polyurethane requires a blowing agent to generate the foam. The choice of a blowing agent is a complicated matter that depends on many factors including thermal conductivity, cost, flammability, toxicity, and environmental factors such as ozone depletion and global warming potential. When used as refrigerator liners, the ABS resin is also exposed to foamed-in-place insulation during assembly. Foamed-in-place insulation typically generates a rush of chemical blowing agent (one chemical or mixtures of different chemicals) so as to foam the insulating material (e.g. polyurethane).

As ABS liners are exposed to the blowing agent, the ABS resin has to be designed and composed in a way that it provides chemical resistance against the applied blowing agent. Otherwise it will degrade the ABS material, when getting in contact with the liner, causing it to crack. To date, several ABS compositions were invented that show good stress cracking resistance against commonly used foam blowing agents such as chlorofluorocarbons (CFC), hydrochlorofluorocarbons (HCFC), hydrofluorocarbons (HFC), and hydrocarbons (e.g. cyclopentane).

US 2008/0093578 discloses a thermoplastic resin composition for a refrigerator, comprising an ABS graft copolymer resin (A) obtained by emulsion polymerization, a styrenic copolymer (B) comprising (b1) a copolymer prepared by copolymerizing polybutadiene with acrylonitrile and styrene and (b2) a copolymer prepared by copolymerizing polybutadiene with styrene, and a SAN-copolymer (C). Said resin composition is stress crack resistant against HCFC.

In regard to the environmental factors, particularly global warming potential, a new class—the "Fourth Generation"—of blowing agents was developed that contains olefinic unsaturation. The unsaturation in the structure of these so-called HFOs (hydrofluoro olefins, e.g. trans-1-chloro-3,3,3-trifluoropropene, trade name Solstice® LBA, Honeywell or Forane® 1233zd, Arkema as well as (Z)-1,1,1-4,4,4-hexafluorobutene, FHO-1336mzz-Z trade name Formacel® 1100, Chemours) cause them to readily decompose in the atmosphere in a matter of days rather than hundreds of years, thereby minimizing harmful global warming. However, although these HFO blowing agents have some appealing advantages, they appear to be more susceptible to cause environmental stress cracks and damage to the ABS material comprised in the inner liner of a refrigerator.

US 2014/019090978 describes refrigerators which are insulated with a polyurethane foam in which the blowing agent comprises substantially 1-chloro-3,3,3-trifluoropropene. Preferably the inner liner of the refrigerator is formed in large part from High Impact Polystyrene (HIPS). Further suitable materials from which the liner may be formed at least partly are GPPS, styrene copolymers, such as styrene-butadiene block copolymers, ASA, ABS, polyolefins, (meth)acrylates such as PMMA, PC, PVC, PET and mixtures of these. In all examples only HIPS alone has been used.

For application of this new type of blowing agent, an ABS resin is needed that provides not only most of the favorable properties known for ABS material like strength, toughness (impact resistance), appearance (gloss and color), processability, and price but in particular shows high stress crack resistance against olefinic blowing agents or mixtures containing olefinic blowing agents.

The formation of aggressive environmental stress cracks due to the presence of HFO against ABS resins and its potential to reduce the lifetime of ABS resin inner liners in cooling apparatuses is the problem addressed by the present invention.

It is one object of the invention to provide ABS resin compositions suitable for inner liners of cooling apparatuses that show most of the favorable properties known for ABS materials and exhibit in particular improved environmental stress crack resistance (ESCR) properties in presence of olefinic unsaturated blowing agents, in particular in presence of hydrofluoro olefins (HFO). The compositions used in the present invention show this superior property profile.

One aspect of the invention is the use of a thermoplastic molding composition in hydrofluoro olefin containing areas, comprising (or consisting of) components A, B, C and, if present, D:

(A) 10 to 35% by weight of at least one graft rubber copolymer A obtained by emulsion polymerization and built up from
  ($a_1$) 30 to 90% by weight, based on (A), of at least one graft base ($a_1$) made from
    ($a_{11}$) 70 to 98% by weight, based on ($a_1$), of at least one diene, in particular 1,3-butadiene, and
    ($a_{12}$) 2 to 30% by weight, based on ($a_1$), of at least one monomer selected from the group consisting of: styrene, α-methylstyrene, acrylonitrile, methacrylonitrile and methyl methacrylate, in particular styrene; and
  ($a_2$) 10 to 70% by weight, based on (A), of a graft ($a_2$), grafted onto the graft base and built up from
    ($a_{21}$) 65 to 95% by weight, based on ($a_2$), of at least one vinylaromatic monomer, in particular styrene,
    ($a_{22}$) 5 to 35% by weight, based on ($a_2$), acrylonitrile and/or methacrylonitrile, preferably acrylonitrile, and
    ($a_{23}$) 0 to 20% by weight, based on ($a_2$), of at least one monomer selected from the group consisting of:

$C_1$-$C_4$-alkyl(meth)acrylates, maleic anhydride, N-phenyl maleimide, N-cyclohexyl maleimide and (meth)acrylamide;

(B) 50 to 75% by weight of at least one copolymer B made from
- ($b_1$) 50 to 95% by weight, based on (B), of at least one vinylaromatic monomer, preferably styrene or α-methylstyrene, more preferred styrene, and
- ($b_2$) 5 to 50% by weight, based on (B), acrylonitrile and/or methacrylonitrile, preferably acrylonitrile, and
- ($b_3$) 0 to 20% by weight, based on (B), of one or more of the monomers as described for ($a_{23}$), (C) 4 to 20% by weight of at least one copolymer C made from
- ($c_1$) 70 to 91% by weight, based on (C), ethylene,
- ($c_2$) 9 to 30% by weight, based on (C), at least one, preferably one, $C_1$-$C_6$-alkyl(meth)acrylate, preferably $C_1$-$C_6$-alkylacrylate, more preferred methyl-, ethyl- and/or n-butylacrylate, most preferred methyl- and/or ethylacrylat, in particular methylacrylate, and
- ($c_3$) 0 to 15% by weight, based on (C), of at least one further comonomer copolymerizable with (c1) and (c2), preferably selected from the group consisting of: carbon monoxide, alpha-olefins such as propene and/or (meth)acrylic acid, glycidyl (meth)acrylate;

(D) 0 to 20% by weight of at least one graft rubber copolymer D obtained by mass polymerization and built up from
- ($d_1$) 10 to 25% by weight, based on (D), of at least one graft base ($d_1$) made from
  - ($d_{11}$) 75 to 100% by weight, based on ($d_1$), of at least one diene, in particular 1,3-butadiene, and
  - ($d_{12}$) 0 to 25% by weight, based on ($d_1$), of at least one vinylaromatic monomer, preferably styrene or α-methylstyrene, more preferred styrene, and
- ($d_2$) 75 to 90% by weight, based on (D), of a graft ($d_2$), grafted onto the graft base and built up from
  - ($d_{21}$) 68 to 82%, preferably 70 to 80%, by weight, based on ($d_2$), of at least one vinylaromatic monomer, preferably styrene or α-methylstyrene, more preferred styrene,
  - ($d_{22}$) 18 to 32%, preferably 20 to 30%, by weight, based on ($d_2$), acrylonitrile or methacrylonitrile, preferably acrylonitrile, and
  - ($d_{23}$) 0 to 20% by weight, based on ($d_2$), of one or more of the monomers as described for ($a_{23}$);

wherein the sum of components A, B, C and D totals 100% by weight.

According to the invention the term "mass polymerization" means a bulk or solution polymerization or a suspension polymerization in which the polymerization is started as before mentioned as bulk or solution polymerization and is then continued after suspension in water to final conversion.

In accordance with the invention the afore-mentioned molding composition is preferably used for the preparation of inliners for cooling apparatuses, in particular refrigerators.

The term "wt.-%" is identical to "% by weight". The term "pbw" is identical to "parts by weight".

The minimum amount of the optional component D is 0.01%, preferably 0.05%, more preferred 0.10%, by weight. If in said thermoplastic molding composition optional component D is present, and/or the amounts of components A and/or C are further specified, the amount of component B is set within the given range, provided that the amounts of components A to D add up to 100% by weight.

The afore-mentioned thermoplastic molding compositions used in accordance with the invention can further comprise optional components E and/or F.

Component E is at least one inorganic additive E selected from phyllosilicates (E1) and nano calcium carbonate (E2). Component E can be used in amounts of from 0.01 to 10 parts by weight, based on 100 parts by weight of the composition consisting of components A, B, C and D.

Component F is at least one further additive and/or processing aid F. Component F can be used in amounts of from 0.01 to 20 parts by weight, based on 100 parts by weight of the composition consisting of components A, B, C and D.

If in said thermoplastic molding composition optional components E and/or F are present, the minimum amount of each of components E and F is preferably 0.05, more preferred 0.10 parts by weight, based on 100 parts by weight of the composition consisting of components A, B, C and D.

Preferably a thermoplastic molding composition is used in accordance with the invention comprising (consisting of) components A, B, C and D in the following amounts:
- (A): 18 to 28 wt.-%;
- (B): 55 to 75 wt.-%;
- (C): 6 to 15 wt.-%;
- (D): 0 to 15 wt.-%;

wherein components A, B, C and D have the meaning as described for the use before.

More preferred a thermoplastic molding composition is used in accordance with the invention comprising (consisting of) components A, B, C, D in the following amounts:
- (A): 18 to 28 wt.-%;
- (B): 55 to 70 wt.-%;
- (C): 6 to 15 wt.-%;
- (D): 0 to 15 wt.-%;

wherein components A, B, C and D have the meaning as described before.

According to a further preferred embodiment of the invention a thermoplastic molding composition is used in accordance with the invention comprising (consisting of) components A, B, C and D in the following amounts:
- (A): 10 to 35 wt.-%;
- (B): 50 to 75 wt.-%;
- (C): 4 to 20 wt.-%;
- (D): 4 to 20 wt.-%;

wherein components A, B, C and D have the meaning as described before.

In particular preferred is the use of a molding composition consisting of components A, B, C and D in the amounts as hereinbefore defined.

Furthermore preferred are molding compositions used in accordance with the invention consisting of components A, B, C, D and 1 to 20 parts by weight of component F, based on 100 parts by weight of the composition consisting of components A, B, C and D.

Furthermore preferred are molding compositions used in accordance with the invention consisting of components A, B, C, D, and 0.01 to 10, preferably 0.01 to 8, more preferably 0.01 to 5 parts by weight of component E, based on 100 parts by weight of the composition consisting of components A, B, C and D.

Furthermore preferred are molding compositions used in accordance with the invention consisting of components A, B, C, D and, based on 100 parts by weight of the composition consisting of components A, B, C and D, 1 to 20 parts by weight of component F, and 0.01 to 10, preferably 0.01 to 8, more preferably 0.01 to 5 parts by weight of component E.

A further aspect of the invention are thermoplastic molding compositions for use in hydrofluoro olefin containing areas comprising (or consisting of) components A, B, C, D:
- (A): 10 to 35 wt.-%;
- (B): 50 to 75 wt.-%;
- (C): 4 to 20 wt.-%;
- (D): 4 to 20 wt.-%;

wherein components A, B, C and D have the meaning as described for the use of the thermoplastic molding composition above.

The afore-mentioned novel thermoplastic molding compositions according to the invention can further comprise optional components E and/or F in the amounts as described above. All the definitions of components A, B), C), D) and optional components E) and F) given for the use of the thermoplastic molding composition in accordance with the invention hereinbefore are also valid for the thermoplastic molding compositions. The afore-mentioned inventive molding composition can preferably be used for the preparation of inliners for cooling apparatuses, in particular refrigerators.

Preferred is an inventive molding composition comprising (consisting of):
- (A): 18 to 28 wt.-%;
- (B): 55 to 70 wt.-%;
- (C): 6 to 15 wt.-%;
- (D): 6 to 15 wt.-%; wherein components A, B, C and D have the meaning as described before.

More preferred is a molding composition as defined above comprising (consisting of):
- (A): 18 to 28 wt.-%;
- (B): 55 to 69 wt.-%;
- (C): 6 to 15 wt.-%;
- (D): 6 to 15 wt.-%;

wherein the sum of components A, B, C and D totals 100% by weight, and which further comprises 1 to 20 parts by weight of component F, based on 100 parts by weight of the composition consisting of components A, B, C and D.

A further aspect of the invention is the use of said thermoplastic molding compositions for the preparation of inliners for cooling devices, in particular refrigerators, as herein-before described.

Component A (Graft Rubber Copolymer A)

The at least one graft rubber copolymer A is used as an impact modifier and forms a soft phase having a glass transition temperature $T_g$ of <0° C., preferably <−20° C., particularly preferably <−40° C. The glass transition temperature $T_g$ is measured by dynamic mechanical analysis (DMA) using a frequency of 1 Hz.

Preferably at least one graft copolymer A according to the invention is used which is built up from $a_1$: 40 to 90 wt.-%, preferably 45 to 85 wt.-%, particularly preferably 45 to 75 wt.-% of at least one graft base $a_1$, based on (A), made from:
  80 to 98 wt.-%, preferably 85 to 97 wt.-%, based on ($a_1$), of at least one diene ($a_{11}$), preferably 1,3-butadiene,
  2 to 20 wt.-%, preferably 3 to 15 wt.-%, based on ($a_1$), of at least one monomer ($a_{12}$), preferably styrene; and $a_2$: 10 to 60 wt.-%, preferably 15 to 55 wt.-%, particularly preferably 25 to 55 wt.-%, based on (A), of a graft $a_2$, grafted onto the graft base $a_1$ and built up from:
  65 to 80 wt.-%, in particular 65 to 75 wt.-%, based on ($a_2$), of at least one vinylaromatic monomer ($a_{21}$), in particular styrene, and
  20 to 35 wt.-%, in particular 25 to 35 wt.-%, based on ($a_2$), of acrylonitrile and/or methacrylonitrile ($a_{22}$), preferably acrylonitrile, and
  0 to 20% by weight, based on ($a_2$), of at least one monomer ($a_{23}$).

The diene $a_{11}$ is preferably 1,3-butadiene and/or isoprene, more preferably 1,3-butadiene. The comonomer $a_{12}$ is preferably styrene. The vinylaromatic monomer $a_{21}$ is preferably styrene and/or α-methylstyrene, more preferred styrene. Comonomer $a_{22}$ is acrylonitrile and/or methacrylonitrile, preferably acrylonitrile. Further comonomer $a_{23}$ is at least one monomer selected from the group consisting of: $C_1$-$C_4$-alkyl(meth)acrylates, maleic anhydride, N-phenyl maleimide, N-cyclohexyl maleimide and (meth)acrylamide, preferably $C_1$-$C_4$-alkyl(meth)acrylates and maleic anhydride. Preferably comonomer $a_{23}$ is not present.

The weight average particle diameter $D_w$ of the at least one graft base a1 of the graft copolymer A is generally 0.15 μm to 0.80 μm, preferably 0.15 to 0.50 μm, particularly preferably 0.20 μm to 0.50 μm, most preferably 0.25 to 0.40 μm.

One or more graft copolymers A with uni-, bi-, tri- or multimodal particle size distributions can be used. The weight average particle diameter $D_w$ can be determined by a measurement with an ultracentrifuge (see W. Scholtan, H. Lange: Kolloid Z. u. Z. Polymere 250, pp. 782 to 796 (1972)) or a disc centrifuge DC 24000 by CPS Instruments Inc. at a rotational speed of the disc of 24,000 r.p.m. The particle diameter can also be determined by static light scattering (see A. Schmidt in Houben-Weyl, Methoden der Organischen Chemie, Georg Thieme Verlag, Stuttgart, 1987, volume E20, pp. 238-248) wherein with this method in opposite to the two first no information about the particles size distribution is obtained. For definition of the weight average particle size $D_w$ see: G. Lagaly, O. Schulz, R. Zimehl: Dispersionen and Emulsionen: Eine Einführung in die Kolloidik feinverteilter Stoffe einschließlich der Tonminerale, Darmstadt: Steinkopf-Verlag 1997, ISBN 3-7985-1087-3, page 282, formula 8.3b.

Preferred diene rubbers (graft bases $a_1$) and graft copolymers A are described in EP-B 0993476, in WO 2001/62848 A1 and in WO 2012/022710 (in particular pages 23-28).

Processes for the preparation of the graft copolymers A are known to a person skilled in the art and described in the literature. According to the invention the graft base ($a_1$) and the graft copolymers A are obtained from free-radical emulsion polymerization (EP-B 993 476, WO 2001/62848 and WO 2012/022710).

Suitable temperatures for the emulsion polymerization process are generally from 20 to 100° C., preferably 30 to 90° C. As emulsifiers there may be used conventional emulsifiers for example, alkali metal salts of alkyl- or alkylarylsulfonic acids, alkyl sulfates, salts of higher fatty acids having 10 to 30 carbon atoms, sulfosuccinates, ether sulfonates or rosin soaps from different natural raw materials. Preference is given to alkali metal salts, in particular the sodium and potassium salts, of alkylsulfonates or fatty acids having 10 to 18 carbon atoms.

Further preference is given to resin or rosin acid-based emulsifiers, in particular alkaline salts of the rosin acids. Salts of the resin acids are also known as rosin soaps. Examples include alkaline soaps as sodium or potassium salts from disproportionated and/or dehydrated and/or hydrated and/or partially hydrated gum rosin with a content of dehydroabietic acid of at least 30 wt.-% and preferably a content of abietic acid of maximally 1 wt.-%. Furthermore, alkaline soaps as sodium or potassium salts of tall resins or tall oils can be used with a content of dehydroabietic acid of preferably at least 30 wt.-%, a content of abietic acid of preferably maximally 1 wt.-% and a fatty acid content of preferably less than 1 wt.-%. Mixtures of the aforementioned emulsifiers can also be used for the production of the starting rubber latices. The use of alkaline soaps as sodium or potassium salts from disproportionated and/or dehydrated and/or hydrated and/or partially hydrated gum rosin with a content of dehydroabietic acid of at least wt.-% and a content of abietic acid of maximally wt.-% is advantageous.

In general, the emulsifiers are used in amounts of 0.5 to 5 wt.-%, in particular from 0.5 to 4 wt.-%, based on the monomers used for the preparation of the graft base a1.

Preferably for the preparation of the dispersion so much water is used that the finished dispersion has a solids content of 20 to 50 wt.-%.

For initiating the polymerization radical initiators are suitable, which decompose at the selected reaction temperature, i.e. those which decompose by heat alone, as well as those decomposing in the presence of a redox system. The polymerization initiators used are preferably those forming free-radicals, such as peroxides, preferably peroxosulphates (as sodium or potassium persulfate) and azo compounds such as azodiisobutyronitrile. Redox systems can also be used, in particular those based on hydroperoxides, such as cumene hydroperoxide or tert-butyl hydroperoxide together with a reducing agent, e.g. succrose, dextrose and ferrous iron.

In general, the polymerization initiators are used in an amount of 0.05 to 1 wt.-%, preferred 0.1 to 1 wt.-%, based on the graft base monomers $a_{11}$ and $a_{12}$.

The polymerization initiators and also the emulsifiers can be added to the reaction mixture, either discontinuously as the total amount at the beginning of the reaction, or, continuously divided into several portions intermittently at the beginning and at one or more later time points during a specified time interval. Continuous addition may also follow a gradient, which can for example rise or decline and can be linear or exponential, or stepwise.

Further, molecular weight regulators such as, e.g. ethylhexylthioglycolate, n- or t-dodecyl mercaptan and other mercaptans, terpinols and dimeric alpha-methyl styrene or other suitable compounds for regulating the molecular weight can be used. The molecular weight regulators can be added to the reaction mixture batchwise or continuously, as described for the polymerization initiators and emulsifiers before.

To maintain a constant pH-value which is preferably from 6 to 12.5, preferred 7 to 12.0, buffer substances such as $Na_2HPO_4/NaH_2PO_4$, sodium hydrogen carbonate, sodium carbonate or buffers based on citric acid/citrate, can be used additionally. Regulators and buffer substances are used in the usual amounts.

In a particular preferred embodiment, during the grafting of the graft base $a_1$ with the monomers $a_{21}$ and $a_{22}$ and optionally $a_{23}$ a hydroperoxide and a reducing agent are added together with ferrous iron.

The person skilled in the art selects the polymerization conditions, in particular the type, quantity and dosage of the emulsifier and of the other polymerization auxiliaries so that the resultant rubber latex (graft base) $a_1$ of the graft copolymer A has an average particle size, defined by the weight average particle diameter $D_w$ of from 0.15 µm to 0.80, preferably 0.15 to 0.60 µm, particularly preferably 0.20 µm to 0.50 µm, most preferably 0.25 to 0.40 µm.

In case of a monomodal particle size distribution the resultant particle diameter $D_w$ of the polymer particles of the graft base a1 is preferably from 0.20 µm to 0.50 µm, more preferably 0.25 to 0.40 µm.

One can also select the polymerization conditions so, that the polymer particles of the graft base $a_1$ have a bi-, tri- or poly-modal particle size distribution in the aforementioned ranges. A bi-, tri- or polymodal particle size distribution can be achieved by a (partially) agglomeration of the graft base particles $a_1$.

Furthermore and preferred in accordance with the invention, to achieve a bi-, tri- or polymodal particle size distribution of the graft rubber copolymer (A), it is possible to prepare, separately from one another in the usual manner, two or more different graft bases $a_{1-1}$), $a_{1-2}$) etc. differing in their weight average particle size $D_w$, and to mix said graft bases $a_{1-1}$), $a_{1-2}$) etc. in the desired mixing ratio.

Advantageously first a graft base $a_1$ is prepared in the usual manner, which is then separately agglomerated in two or more batches to obtain two or more different graft bases $a_{1-1}$), $a_{1-2}$) etc. differing in their particle size $D_w$. Afterwards the graft $a_2$ is grafted onto the mixture of said (agglomerated) graft bases $a_{1-1}$), $a_{1-2}$) etc.

Preferred is the use of a graft rubber copolymer (A) having a bimodal particle size distribution which is prepared from a mixture of a(n) (agglomerated) graft base $a_{1-1}$) of fine particles having a particle size $D_w$ of from 0.15 to 0.30 µm, preferably 0.15 to 0.25 µm and a(n) (agglomerated) graft base $a_{1-2}$) of coarse particles having a particle size $D_w$ of from 0.40 to 0.80 µm, preferably 0.45 to 0.60 µm. The mixing ratio of graft bases $a_{1-1}$) to $a_{1-2}$) is preferably from 50/50 to 90/10.

According to a particular embodiment, the graft base $a_1$ can be prepared by polymerizing the monomers $a_{11}$ to $a_{12}$ in the presence of a finely divided latex (so-called "seed latex" polymerization). This latex is provided and can be made of elastomeric polymers forming monomers or from other monomers such as those mentioned above. Suitable seed latices consist for example of polybutadiene or polystyrene.

In the seed polymerization usually first a finely divided polymer, preferably a polybutadiene, is produced as seed latex and then this seed latex is further polymerized with monomers comprising butadiene into larger particles (see Houben-Weyl, Methoden der Organischen Chemie, Makromolekulare Stoffe, Part 1, p. 339 (1961), Thieme Verlag, Stuttgart). It is preferably carried out using the seed batch process or using the seed-feed process. Preferred graft bases $a_1$ and graft copolymers A may be obtained by the seed polymerization technology described in the document WO 2012/022710 A1.

In another preferred embodiment, the graft base $a_1$ is produced in a so-called feed process. In this method, a certain proportion of the monomers $a_{11}$ and $a_{12}$ is provided and the polymerization is started, after which the remainder of the monomers $a_{11}$ and $a_{12}$ ("feed portion") is added as a feed during the polymerization.

The feed parameters (gradient shape, amount, duration, etc.) depend on the other polymerization conditions. The addition of the radical initiator and emulsifier is as described before. Preferably in the feed process, the proportion of the monomers first provided is up to 50 wt.-%, preferably up to 40 wt.-%, based on $a_1$. Preferably the remainder of the monomers $a_{11}$ to $a_{12}$ is fed within 1 to 18 hours, in particular 2 to 16 hours, more preferred 4 to 12 hours.

In the second stage, the rubber latex is agglomerated. This can be done by adding a dispersion of an acrylic ester copolymer as agglomeration agent. Preferably dispersions of copolymers made from (C1-C4 alkyl)esters of acrylic acid, preferably of ethyl acrylate, and 0.1 to 10 wt.-% monomers forming polar polymers such as acrylic acid, methacrylic acid, acrylamide or methacrylamide, N-methylol methacrylamide or N-vinyl pyrrolidone, are used. Particularly preferred is a copolymer made from 96% ethyl acrylate and 4% of methacrylamide. The agglomerating dispersion may optionally contain one or more of the above acrylic ester copolymers.

The concentration of the acrylate copolymers in the dispersion used for the agglomeration is generally between 3 and 40 wt.-%. For the agglomeration from 0.2 to 20, preferably 1 to 5 parts by weight of the agglomerating dispersion are used based on 100 parts of the rubber latex, in each case calculated on the solids content. The agglomeration is carried out by adding the agglomerating dispersion to the rubber. The addition rate usually is not critical, in general it takes about 1 to 30 minutes at a temperature between 20 and 90° C., preferably between 30 and 75° C.

Particular preference is given to the agglomeration of the rubber latex (graft base $a_1$) with an acid, preferably with an acid anhydride and more preferably acetic anhydride (see WO 2012/022710, p. 9-10). Preferably the rubber latex $a_1$ is mixed with said acid, and after agglomeration is complete, preferably restabilization with a base, preferably a potassium hydroxide solution, alone or in combination with an emulsifier solution such as Sodium or Potassium naphthalene sulfonate formaldehyde condensates or rosin soap is carried out. Preferred for the restabilization is a combination of potassium hydroxide solution with sodium or potassium naphthalene sulfonate formaldehyde condensates or rosin soap.

Preferably, acetic anhydride is used for this agglomeration. However, other organic anhydrides can also be used. It is also possible to use mixtures of acetic anhydride with acetic acid or mixtures of organic anhydrides with acetic acid or other carboxylic acids.

Once the agglomeration is complete, the agglomerated rubber latex is preferably restabilized with a base such as potassium hydroxide solution alone, or, preferably in combination with an emulsifier solution such as sodium or potassium naphthalene sulfonate formaldehyde condensates or rosin soap, so that the result is a pH value of preferably more than pH 7.5. Other alkaline solutions, such as, e.g., sodium hydroxide solution, can be used, albeit this is less preferred.

According to a preferred embodiment first, the starting rubber latex is provided, wherein, in a preferred form, the solid content of the solid of this latex is adjusted to from 25 to 45 wt.-% by the addition of water. The temperature of the starting rubber latex, optionally mixed with water, can be adjusted in a broad range of from 0° C. to 70° C., preferably of from 0° C. to 60° C., and particularly preferably of from 15° C. to 50° C.

Preferably at this temperature, a mixture of preferably acetic anhydride and water, which was prepared by mixing, is added to the starting rubber latex under good mixing. The addition of the acetic anhydride-water mixture and the mixing with the starting rubber latex should take place within a time span of two minutes at most in order to keep the coagulate formation as small as possible. The coagulate formation cannot be avoided completely, but the amount of coagulate can be limited advantageously by this measure to significantly less than 1 wt.-%, generally to significantly less than 0.5 wt.-% based on the solids of the starting rubber latex used.

Preferably the mixing ratio of the acetic anhydride-water mixture used in the agglomeration step is 1:7.5 to 1:40, preferably 1:10 to 1:30, more preferably 1:15 to 1:30. When the acetic anhydride-water mixture is added, agglomeration of the fine-particle rubber particles within the starting rubber latex to form larger rubber particles starts and is finished after 5 to 60 minutes according to the adjusted temperature. The rubber latex is not stirred or mixed in this phase. The agglomeration, the increase in size of the rubber particles, comes to a standstill when the entire amount of acetic anhydride is hydrolyzed and the pH value of the rubber latex does not drop any further. For restabilization, again preferably potassium hydroxide solution or, preferably in combination with an emulsifier solution as before mentioned, is carefully added to the rubber latex and mixed with the rubber latex, so that a pH value of the rubber latex of at least pH 7.5 results.

According to a further preferred embodiment, the agglomeration step is carried out by the addition of 0.1 to 5 parts by weight of acetic acid anhydride per 100 parts of the starting rubber latex solids. The starting rubber latex solids means here a solid content of preferably 25 to 45 wt.-% (evaporation sample at 180° C. for 25 min. in drying cabinet), more preferably 30 to 45 wt.-%, particularly preferably 35 to 45 wt.-%.

Furthermore agglomeration by pressure or freezing (pressure or freeze agglomeration) is possible. Said methods mentioned are known to a person skilled in the art.

The gel contents of the graft base $a_1$ may in principle be adjusted in a manner known per se by employing suitable reaction conditions (e.g. high reaction temperature and/or polymerization up to a high conversion, as well as optionally the addition of crosslinking substances in order to achieve a high gel content, or for example low reaction temperature and/or termination of the polymerization reaction before a too high degree of crosslinking has occurred, as well as optionally the addition of molecular weight regulators, such as for example n-dodecyl mercaptan or t-dodecyl mercaptan in order to achieve a low gel content).

Usually, the polymerization of the graft base $a_1$ is performed by selecting the reaction conditions, so that a graft base $a_1$ with a specific crosslinking state is obtained. Essential parameters therefor are inter alia the reaction temperature and time, the ratio of monomers, regulators, free-radical initiators and, for example in the feed process, the feed rate and the amount and time of addition of regulator and initiator.

The crosslinking state of the graft base $a_1$ can be measured by the gel content which is the product portion, which is crosslinked and thus not soluble in a particular solvent. The values given for the gel content relate to the determination by the wire cage method in toluene (see Houben-Weyl, Methoden der Organischen Chemie, Makromolekulare Stoffe, Part 1, p. 307 (1961), Thieme Verlag Stuttgart).

Usual gel contents of the graft bases $a_1$ used in the invention are in the range from 60 to 98%, preferably 65 to 98%, more preferably 70 to 97%, most preferably 75 to 95%. Preferably the gel content of the graft base $a_1$ is 70 to 97%, preferred 75 to 95% and the swelling degree of the gel in toluene is in the range of 15 to 35, preferably in the range of 18 to 33.

The preparation of the graft $a_2$ grafted onto the graft base $a_1$ can be performed under the same conditions as the preparation of the grafting base $a_1$, in doing so it being possible to produce the graft $a_2$ in one or more process steps. Further details for the preparation of graft copolymers A are described in DE 12 60 135 and WO 2012/022710. The graft polymerization of the monomers $a_{21}$, $a_{22}$ and $a_{23}$ is also carried out in a free-radical emulsion polymerization technique. It may be carried out in the same system as the polymerization of the graft base $a_1$, and further emulsifier and initiator may be added.

These need not be identical with the emulsifiers or initiators used for preparing the graft base $a_1$. For the selection of emulsifier, initiator, regulator etc. the same remarks apply as for the preparation of the graft base $a_1$. The monomer mixture to be grafted can be added to the reaction mixture all at once, batch-wise in several stages, or preferably, continuously during the polymerization.

As far as during the grafting of the graft base $a_1$ nongrafted polymers of the monomers $a_{21}$ to $a_{22}$ are obtained, their amounts are assigned to the weight of component A. Said amounts are generally in the range of from 10 to 50%, based on $a_2$.

Preferably at least one graft copolymer A is used obtained by emulsion polymerization of $a_1$: 40 to 90 wt.-%, preferably 45 to 85 wt.-%, based on (A), particularly preferably 45 to 75 wt.-% of at least one graft base $a_1$ made from:
  ($a_{11}$) 80 to 98 wt.-%, preferably 85 to 97 wt.-%, based on $a_1$, of 1,3-butadiene,
  ($a_{12}$) 2 to 20 wt.-%, preferably 3 to 15 wt.-%, based on $a_1$, of styrene; and
$a_2$: 10 to 60 wt.-%, preferably 15 to 55 wt.-%, based on (A), particularly preferably 25 to 55 wt.-% of a graft $a_2$, grafted onto the graft base $a_1$ and built up from:
  $a_{21}$: 65 to 80 wt.-%, in particular 65 to 75 wt.-%, based on $a_2$, of styrene; and
  $a_{22}$: 20 to 35 wt.-%, in particular 25 to 35 wt.-%, based on $a_2$, of acrylonitrile.

Component B

Component B forms a polymer "hard phase" having a glass transition temperature Tg of >20° C., measured by dynamic mechanical analysis (DMA) using a frequency of 1 Hz. Preferably component B is at least one copolymer B obtained by polymerization of styrene or α-methylstyrene (b1) and acrylonitrile (b2), a so-called SAN-copolymer or AMSAN copolymer. SAN-copolymers are even more preferred.

Said SAN and AMSAN copolymers generally are made from 18 to 40 wt.-%, preferably 22 to 33 wt.-%, particularly preferably 25 to 31 wt.-% of acrylonitrile, and 82 to 60 wt.-%, preferably 78 to 67 wt.-%, particularly preferably 75 to 69 wt.-% styrene or α-methylstyrene, wherein the sum of styrene or α-methylstyrene and acrylonitrile totals 100 wt.-%.

Component B, in particular said at least one SAN- or AMSAN-copolymer, preferably has a weight average molar mass $M_w$ of from 85,000 to 300,000 g/mol, more preferably from 120,000 to 250,000 g/mol and most preferably from 140,000 to 230,000 g/mol, measured by gel permeation chromatography and using polystyrene for calibration. Preferably component B is a mixture of at least two, preferably two, three, four or five, SAN-copolymers having different weight average molar masses $M_w$ in the aforementioned ranges.

Copolymers B are obtained in a known manner by bulk, solution, suspension, precipitation or emulsion polymerization, bulk, suspension and solution polymerization are preferred. Details of these processes are described, for example in "Kunststoffhandbuch, Eds. R. Vieweg and G. Daumiller, Vol. 4 "Polystyrol", Carl Hanser Verlag, Munich 1996, p 104 ff and in "Modern Styrenic Polymers: Polystyrenes and Styrenic copolymers" (Eds., J. Scheirs, D. Priddy, Wiley, Chichester, UK, (2003), pages 27 to 29) and in GB-A 1,472,195. The melting volume rate (MVR, measured according to ISO 1133 at 220° C. and 10 kg load) of component B, in particular of the at least one SAN-copolymer as defined above, is preferably at least 3 mL/10 min, more preferably in the range of from 3 to 20 mL/10 min. Preferably component B is a mixture of at least two, preferably two, three, four or five, copolymers B, preferably SAN-copolymers B, with different MVRs in the range of from 3 to 90 mL/10 min. The ratio of said at least two, preferably two, three, four or five, copolymers B, preferably SAN-copolymers B, with different MVR is chosen so, that the resulting MVR of the mixture is preferably in the range of from 3 to 20 mL/10 min.

Component C

Preferably the at least one—preferably one—copolymer C is made from:
  70 to 85% by weight, based on (C), ethylene ($c_1$),
  15 to 30% by weight, based on (C), at least one, preferably one, $C_1$-$C_6$-alkyl(meth)acrylate ($c_2$), preferably $C_1$-$C_6$-alkylacrylate, more preferred methyl-, ethyl- and/or n-butylacrylate, most preferred methyl- and/or ethylacrylat, in particular methylacrylate, and
  0 to 10% by weight, based on (C), of at least one further comonomer ($c_3$) which is copolymerizable with ($c_i$) and ($c_2$), preferably selected from the group consisting of: carbon monoxide, alpha-olefins such as propene and/or (meth)acrylic acid, glycidyl (meth)acrylate.

Alkyl(meth)acrylate ($c_2$) means an alkyl ester of acrylic or methacrylic acid. The alkyl group of the acrylic or methacrylic acid ester may contain from 1 to 6 carbon atoms and means in particular methyl, ethyl, propyl, isopropyl, n-butyl, sec-butyl, tert-butyl, isobutyl and isoamyl, with the preferred esters being the methyl and the ethyl esters.

Preferably copolymer C is made from ethylene ($c_1$) and methylacrylate ($c_2$).

Said copolymers C can be prepared by known methods as disclosed, for example, in U.S. Pat. No. 3,350,372, the disclosure of which is incorporated herein by reference.

Preferably the Melt Flow Rate (MFR) of component C is 0.5-50 g/10 min (190° 012.16 kg) (ASTM D1238; ISO 1133-1:2011), more preferred 0.5 to 10 g/10 min. Component C generally has a weight average molar mass $M_w$ of less than 1,000,000 g/mol, preferably less than 700,000 g/mol, more preferred less than 500,000 g/mol. Suitable and preferred copolymers C are commercially available as Elvaloy® AC from DuPont®, the Elvaloy AC ethylene-methylacrylates being in particular preferred, in particular those which comprise only ethylene and methylacrylates units.

Component D

Graft rubber copolymer D as described above is preferably built up from
  ($d_1$) from 12 to 20% by weight, based on (D), of a graft base ($d_1$), and
  ($d_2$) from 80 to 88% by weight, based on (D), of a graft ($d_2$), grafted onto the graft base.

Preferred is a graft rubber copolymer D as described above wherein component $d_{23}$ is not present. Furthermore preferred is a graft rubber copolymer D as described above wherein component $d_{11}$ is 1,3-butadiene. Furthermore preferred is a graft rubber copolymer D as described above wherein component $d_{12}$ is styrene. Furthermore preferred is a graft rubber copolymer D as described above wherein component $d_{21}$ is styrene. Furthermore preferred is a graft rubber copolymer D as described above wherein component $d_{22}$ is acrylonitrile.

More preferred is graft rubber copolymer D as described above built up from:
- ($d_1$) 10 to 25%, preferably 12 to 20%, by weight, based on (D), of a graft base ($d_1$) made from
  - ($d_{11}$) 75 to 100% by weight, based on ($d_1$), 1,3-butadiene, and
  - ($d_{12}$) 0 to 25% by weight, based on ($d_1$), styrene; and
- ($d_2$) 75 to 90%, preferably 80 to 88% by weight, based on (D), of a graft ($d_2$), grafted onto the graft base and built up from
  - ($d_{21}$) 68 to 82%, preferably 70 to 80%, by weight, based on ($d_2$), styrene,
  - ($d_{22}$) 18 to 32%, preferably 20 to 30%, by weight, based on ($d_2$), acrylonitrile.

The graft base $d_1$ can be a linear polymer, a long-chain branched polymer or a star-branched polymer. Graft base $d_1$ generally is a soluble polymer with no or negligible amount of insoluble parts. Comonomers $d_{11}$ and $d_{12}$ can be polymerized statistically, in block form or in tapered form (gradient composition of $d_{11}$ and $d_{12}$).

Preferably graft base $d_1$ is obtained by anionic polymerization.

The mass polymerization is preferably conducted in a monomer medium rather than in water, usually employing a series of two or more continuous reactors. The graft base ($d_1$) used in this process is most commonly a solution polymerized diene homo- or copolymer. Often a solution of the graft base ($d_1$) in the monomers ($d_{21}$) and ($d_{22}$) is prepared for feeding to the reactor system. It is also possible to use only a part of the monomers ($d_{21}$) and ($d_{22}$) (fresh and unreacted monomers from the devolatilization) and to feed the remaining part to the reactors.

In the mass process, the graft base ($d_1$) initially dissolved in the monomer mixture will phase separate, forming discrete rubber particles as polymerization of monomers ($d_{21}$) and ($d_{22}$) proceeds. This process is referred to as phase inversion since the continuous phase shifts from rubber to graft rubber copolymers D during the course of polymerization. Special reactor designs are used to control the phase inversion portion of the reaction. By controlling the shear rate in the reactor, the rubber particle size can be modified to optimize properties. Grafting of some of the copolymerized monomers ($d_{21}$) and ($d_{22}$) onto the rubber particles occurs. The reaction recipe can include polymerization initiators, chain-transfer agents, and other additives. Diluents are sometimes used to reduce the viscosity of the monomer and polymer mixture to facilitate processing at high conversion. The reaction is preferably carried out as a free radical-solution polymerization. The product from the reactor system is usually devolatilized to remove the unreacted monomers and is then pelletized. Equipment used for devolatilization includes single- and twin-screw extruders and flash and thin film/strand evaporators.

Unreacted monomers can be recovered and recycled back to the reactors to improve the process yield.

The suspension polymerization process utilizes a mass reaction to produce a partially converted mixture of polymer and monomer and then employs a batch suspension process to complete the polymerization. When the conversion of the monomers is approximately 15 to 30% complete, the mixture of polymer and unreacted monomers is suspended in water with the introduction of a suspending agent. The reaction is continued until a high degree of monomer conversion is attained and then unreacted monomers are usually stripped from the product before the slurry is centrifuged and dried, producing product in the form of small beads. The morphology and properties of the mass suspension product are similar to those of the mass-polymerized product. The suspension process retains some of the process advantages of the water-based emulsion process, such as lower viscosity in the reactor and good heat removal capability.

In case that the graft rubber copolymer D is obtained by free-radical solution polymerization at least one solvent is used such as methylethyl ketone, acetone, toluene and/or ethylbenzene. Preferably the particles of the graft rubber copolymer D) have a weight average particle size $D_w$ in the range of 0.55 to 1.50 μm, preferably 0.60 to 1.00 μm.

Component E

Component E is at least one—preferably one—inorganic additive E selected from phyllosilicates (E1) and nano calcium carbonate (E2).

If component E1 is present, it is preferably used in an amount of from 0.01 to 5 pbw, more preferred 0.05 to 3 pbw, based on 100 parts by weight of the molding composition consisting of components A to D.

If component E2 is present, it is preferably used in an amount of from 0.01 to 5 pbw, more preferred 0.05 to 5 pbw, based on 100 parts by weight of the molding composition consisting of components A to D.

Component E1 is a phyllosilicate. Suitable phyllosilicates are described, by way of example, in Hollemann Wiberg, Lehrbuch der anorganischen Chemie, Walter de Gruyter, Berlin, N.Y. 1985, pp. 771-776.

Use is preferably made of serpentine types, such as chrytosile or antigorite, kaolinite types, such as dickite, nacrite, or halloysite, pyrophyllite, micaceous silicates from the vermiculite group, illite group, or montmorillonite/beidellite group, such as montmorillonite, or else mica, or an aluminosilicate, such as muskovite, phlogopite, or biotite. Very particular preference is given to mica. For the purposes of the present invention, kaolinite types include kaolin, the main mineral of which is kaolinite, and mica-like silicates include bentonite, the main mineral of which is montmorillonite.

According to the invention nano calcium carbonate (E2) means nano-particles of calcium carbonate (NPCC) with a mean size of less than 100 nm, in particular a mean size of 15 to 60 nm, most preferred a mean particle size of about 40 nm. The morphology of the nano-particle can be of different shape such as cubic, spindle, rod or flake, a cubic shape being preferred.

Suitable nano calcium carbonates can be obtained by High Gravity Controlled Precipitation (HGCP) technology and are commercially available from NanoMaterials Technology®.

Component F

Use may be made of other additives (different from component E) and/or processing aids as component F.

Examples of substances of this type are lubricants, mold-release agents, waxes, pigments, dyes, flame retardants, antioxidants, stabilizers to counter the effect of light, fibrous or pulverulent fillers, fibrous or pulverulent reinforcing agents, and antistatic agents, and also other additives, and mixtures of these.

Examples of suitable lubricants and mold-release agents are stearic acids, stearyl alcohol, stearic esters, stearamides, and also silicone oils, montan waxes, and those based on polyethylene or polypropylene. Said lubricants and mold release agents are generally used in amounts up to 3 parts by weight, preferably up to 2 parts by weight, based on 100 parts by weight of the molding composition consisting of components A to D.

Examples of pigments are titanium dioxide, phthalocyanines, ultramarine blue, iron oxides, and carbon black, and the entire class of organic and inorganic pigments. For the purposes of the present invention, dyes are any of the dyes which can be used for the transparent, semitransparent, or non-transparent coloring of polymers, in particular those dyes which are suitable for coloring styrene copolymers. Dyes of this type are known to the skilled worker. Said pigments and dyes are generally used in amounts up to 20 pbw, preferably up to 10 pbw, based on 100 parts by weight of the molding composition consisting of components A to D.

Examples of suitable flame retardants are antimony oxides, such as $Sb_2O_3$, and/or halogenated organic compounds.

Particularly suitable antioxidants are sterically hindered mononuclear or polynuclear phenolic antioxidants, which may have various substituents and may also have bridging by substituents. These include both monomeric and oligomeric compounds, which may have been built up from two or more phenolic building blocks. It is also possible to use hydroquinones or hydroquinone analogs, or substituted compounds, or else antioxidants based on tocopherols or on derivatives of these. It is also possible to use mixtures of various antioxidants. Usually said antioxidants are used in amounts up to 1 pbw, based on 100 parts by weight of the molding composition consisting of components A to D. In principle, use may be made of any compounds which are commercially available or are suitable for styrene copolymers.

Together with the phenolic antioxidants mentioned above by way of example, concomitant use may be made of what are known as costabilizers, in particular phosphorus- or sulfur-containing costabilizers. These P- or S-containing costabilizers are known to the skilled worker and are available commercially.

Examples for suitable antioxidants are:

Esters of 3,5-di-tert.-butyl-4-hydroxyphenylacetic acid with monohydric or polyhydric alcohols, such as for example and preferably decanol, undecanol, dodecanol, tridecanol, tetradecanol, pentadecanol, hexadecanol, octadecanol, 1,6-hexanediol, neopentyl glycol, 1,9-nonanediol, ethylene glycol, diethylene glycol, triethylene glycol, pentaerythritol, 3-thiaundecanol, 3-thiapentadecanol, trimethylol propane;

Esters of β-(3,5-di-tert.-butyl-4-hydroxyphenyl)-propionic acid with the afore-mentioned monohydric or polyhydric alcohols; and Esters of β-(5-tert.-butyl-4-hydroxy-3-methylphenyl)-propionic acid with monohydric or polyhydric alcohols, with the afore-mentioned monohydric or polyhydric alcohols;

Esters of β-(3,5-dicyclohexyl-4-hydroxyphenyl)-propionic acid with the afore-mentioned monohydric or polyhydric alcohols.

Preferred antioxidants are 3,3'-thiodipropionic acid dioctadecylester (CAS-No. 693-36-7), octadecyl-3-(3,5-di-tert.butyl-4-hydroxyphenyl)-propionate (CAS-No. 2082-79-3) and the butylated reaction product of p-cresol and dicyclopentadiene (CAS-No. 68610-51-5).

Examples of suitable stabilizers to counter the effect of light are various substituted resorcinols, salicylates, benzotriazoles, benzophenones, and HALS (hindered amine light stabilizers), for example those commercially available as Tinuvin.

Preferred are Tinuvin 770 DF 1, bis(2,2,6,6,-tetramethyl-4-piperidyl)sebaceate (CAS-No. 52829-07-9), Tinuvin P, 2-(2H-benzotriazol-2-yl)-p-cresol (CAS-No. 2440-22-4), Cyasorb UV 3853, 2,2,6,6-tetramethyl-4-piperidinyl stearate (CAS-No. 167078-06-0), Hostavin N 845 (CAS-No. 86403-32-9) and mixtures thereof.

Said stabilizers are generally used in amounts up to 2 pbw, based on 100 parts by weight of the molding composition consisting of components A to D.

Examples of fibrous or pulverulent fillers are carbon fibers and glass fibers in the form of glass wovens, glass mats, or glass silk rovings, chopped glass, glass beads, and also wollastonite, particularly preferably glass fibers. When glass fibers are used, these may have been provided with a size and with a coupling agent to improve compatibility with the components of the blend. The glass fibers incorporated may either be in the form of short glass fibers or else in the form of continuous strands (rovings). Said filler materials usually are used in amounts up to 20 pbw, preferably up to 10 pbw, based on 100 parts by weight of the molding composition consisting of components A to D.

If not in particular mentioned, the amounts used of each of the additives are those which are usual, and it is therefore unnecessary to give further details in this connection.

Preparation of the Molding Compositions

The preparation of the thermoplastic molding compositions follows conventional procedures which are well known in the art. Preferably, the components A to C and optional components D to F are extrusion blended or compounded in conventional mixing apparatuses (preferably in multi-cylinder mills, mixing extruders or internal kneaders).

Preferably components A, B and C and, optionally, components D to F are mixed and compounded and extruded at elevated temperature, generally at temperatures of from 150° C. to 300° C. During the production, working up, further processing and final shaping, the required or useful additives E and/or F can be added to the thermoplastic molding composition. The final shaping can be carried out on commercially available processing machines, and comprises, for example, injection-molding processing, sheet extrusion with optionally subsequent hot forming, cold forming, extrusion of tubes and profiles and calender processing.

A further aspect of the invention is a shaped article made from the thermoplastic molding composition. The thermoplastic molding composition can be formed into shaped articles by a variety of means such as injection molding, extrusion, compression forming, vacuum forming, blow molding etc. well established in the art. Preferred shaped articles are sheets formed by extrusion or layered sheets formed by co-extrusion. Said sheets can be used for thermoforming and can consist solely of the thermoplastic molding composition as described above or can have a layer structure where at least one cap-layer consists of said molding composition.

A further aspect of the invention is the use of shaped articles, in particular thermoformed sheets, made from the thermoplastic molding compositions as described above in hydrofluoro olefin containing areas. Said shaped articles can advantageously be used as equipment liners (inliners) of cooling apparatuses, e.g. refrigerators. The thermoplastic molding compositions as described above exhibit an improved environmental stress crack resistance (ESCR) in presence of olefinic unsaturated blowing agents, in particular in presence of hydrofluoro olefins (HFO) as well as the favorable properties known for ABS materials and therefore are in particular suitable to manufacture thermoformed equipment liners of cooling apparatuses containing insulation foamed with "Fourth Generation" blowing agents or mixtures containing them.

The examples and claims below give further illustration of the invention.

EXAMPLES

Graft Rubber Copolymer A

Preparation of the Graft Base $a_1$

The particulate cross-linked fine-particle rubber base used for the preparation of component A (emulsion graft rubber copolymer) was prepared by radical emulsion polymerization of butadiene and styrene (monomer weight ratio 90/10) in the presence of distilled tallow fatty acid (CAS-No. 67701-06-8, C14-C18-saturated and C15-C18-unsaturated straight chain aliphatic monocarboxylic acid), tert-dodecylmercaptan as chain transfer agent, potassium persulfate as initiator at temperatures from 60° to 85° C. As salt tetrasodium pyrophosphate is used.

The addition of initiator marked the beginning of the polymerization. Finally the fine-particle butadiene rubber latexes are cooled below 50° C. and the non-reacted monomers were removed partially under vacuum (200 to 500 mbar) at temperatures below 50° C. which defines the end of the polymerization.

The starting styrene/butadiene-rubber (SBR) rubber base so obtained has solid content of 41 wt.-%, a rubber gel content of 93% (wire cage method in toluene), a rubber composition comprising units derived from styrene and butadiene in a weight ratio of 10/90 and a weight-average particle size of 0.08 μm (determined via Differential Centrifugation using a disc centrifuge from CPS Instruments). The starting SBR was subjected to particle size enlargement with acetic anhydride in two batches to a weight-average particle size $D_w$ of 0.25 μm and 0.55 μm, respectively.

In order to achieve agglomerated butadiene rubber latices with $D_w$ of 0.25 μm, the fine-particle butadiene rubber latexes are being provided first at 25° C. and are adjusted if necessary with deionized water to a concentration of 36 wt.-% and stirred. The temperature was raised to 40° C. To this dispersion, 1.3 weight parts of acetic anhydride based on 100 parts of the solids from the fine-particle butadiene rubber latex as aqueous mixture is added and mixed with the latex. After this the agglomeration is carried out for 10 minutes without stirring.

Anionic dispersant of sulfonic polyelectrolyte type (Sodium naphthalene sulfonate formaldehyde condensates, CAS 9084-06-04) are added as aqueous solution to the agglomerated latex and mixed by stirring. Subsequently KOH are added as aqueous solution to the agglomerated latex and mixed by stirring. The solid content of the agglomerated butadiene rubber latex with $D_w$ of 0.25 μm is 28.5 wt.-%.

In order to achieve agglomerated butadiene rubber latices with $D_w$ of 0.55 μm, the fine-particle butadiene rubber latices are being provided first at 25° C. and are adjusted if necessary with deionized water to a concentration of 33 wt.-% and stirred. To this dispersion, 2 weight parts of acetic anhydride based on 100 parts of the solids from the fine-particle butadiene rubber latex as aqueous mixture is added and mixed with the latex. After this the agglomeration is carried out for 30 minutes without stirring. Anionic dispersant of sulfonic polyelectrolyte type (Sodium naphthalene sulfonate formaldehyde condensates, CAS 9084-06-04) are added as aqueous solution to the agglomerated latex and mixed by stirring. Subsequently KOH are added as aqueous solution to the agglomerated latex and mixed by stirring. The solid content of the agglomerated butadiene rubber latex with $D_w$ of 0.55 μm is 24.7 wt.-%. The two latexes with 0.25 μm (80 pts.) and 0.55 μm (20 pts.) were combined to rubber base a1 which is used in the further reaction step in form of polymer latexes which have solids content of 26 wt.-%.

Preparation of the Graft Rubber Copolymer A

The graft copolymer A is prepared (as parts by weight) from 52 styrene/butadiene-rubber (SBR), 34 styrene, 14 acrylonitrile, together with cumene hydroperoxide, dextrose, ferrous sulfate, t-dodecylmercaptane, disproportionated potassium rosinate soap, and emulsion graft polymerization was conducted. Firstly, the afore-mentioned SBR latex $a_1$ was charged, and the temperature was raised to 70° C. Styrene, acrylonitrile, t-dodecylmercaptane, disproportionated potassium rosinate soap and deionized water were added. At 70° C., the catalyst solution (sodium pyrophosphate, dextrose, cumene hydroperoxide and ferrous sulfate dissolved in water) was added. After completion of the addition, the stirring was continued for further 30 minutes, and then the mixture was cooled. To the graft copolymer latex thus obtained, an aging-preventive agent (e.g. Antioxidant PL/Wingstay L, Phenol, 4-methyl-, reaction products with dicyclopentadiene and isobutene, CAS-No. 68610-51-5) was added, and the mixture was added under stirring to an aqueous magnesium sulfate solution heated to 95° C., for coagulation. The coagulated product was washed with water and dried to obtain a high rubber content resin composition in the form of a white powder.

Preparation of the Matrix Copolymer B

Statistical SAN-copolymer B1 was produced by suspension polymerization from 72 wt.-% styrene and 28 wt.-% acrylonitrile with a weight average molar mass of 230,000 kg/mol (determined by gel permeation chromatography and using polystyrene for calibration) and MVR of 3.5 cm³/10 min (220° C./10 kg load (ISO 1133-1:2011)).

Statistical SAN-copolymer B2 was produced by suspension polymerization from 66 wt.-% styrene and 34 wt.-% acrylonitrile with a weight average molar mass of 89,000 kg/mol (determined by gel permeation chromatography and using polystyrene for calibration) and MVR of 75 cm³/10 min (220° C./10 kg load (ISO 1133-1:2011)).

Statistical SAN-copolymer B3 was produced by suspension polymerization from 66 wt.-% styrene and 34 wt.-% acrylonitrile with a weight average molar mass of 180,000 kg/mol (determined by gel permeation chromatography and using polystyrene for calibration) and MVR of 3 cm³/10 min (220° C./10 kg load (ISO 1133-1:2011)).

Statistical SAN-copolymer B4 was produced by mass polymerization from 69 wt.-% styrene and 31 wt.-% acrylonitrile with a weight average molar mass of 140,000 kg/mol (determined by gel permeation chromatography and using polystyrene for calibration) and MVR of 19 cm³/10 min (220° C./10 kg load (ISO 1133-1:2011)).

Statistical SAN-copolymer B5 was produced by suspension polymerization from 69 wt.-% styrene and 31 wt.-% acrylonitrile with a weight average molar mass of 200,000 kg/mol (determined by gel permeation chromatography and using polystyrene for calibration) and MVR of 4 cm³/10 min (220° C./10 kg load (ISO 1133-1:2011)).

Preparation of Graft Rubber Copolymer D (mABS)

Continuous mass ABS copolymer D was produced by free-radical solution polymerization from 17% butadiene, 63% styrene, 20% acrylonitrile by weight in the presence of methylethyl ketone with a gel content of 30% (acetone method), a weight average particle size of the grafted rubber of 0.6 to 1 μm (determined via Differential Centrifugation using a disc centrifuge from CPS Instruments) and a MVR of 5.5 cm³/10 min (ISO 1133-1:2011).

The gel content was determined in acetone or toluene as dispersant. Approximately, 0.25 g of the polymer composition were dispersed in 20 g of dispersant for 12-24 h and separated with an ultracentrifuge at 20,000 rpm at 25° C. into the gel and sol phase. The separated phases were dried and the gel content is calculated by the following formula:

gel=mass(gel phase)/(mass(gel phase)+mass(sol phase))*100[%]

Preparation of the Thermoplastic Molding Compositions

In the following examples and comparative examples, the afore-mentioned copolymers A, B and D and the following components C and F were used in the amounts as given in Table 1. The additives and processing aids (component F) were added to 100 parts by weight (pbw.) of the polymer components as listed in Table 1 (left column).

Component C: Elvaloy® AC 1224: a copolymer of ethylene and methyl acrylate containing 24% by weight methyl acrylate, produced by DuPont; melt flow rate (190° C./2.16 kg) 2.0 g/10 min (ISO 1133/ASTM D1238), density 0.944 g/cm³ (ASTM D792/ISO 1183), melting point by DSC 91° C. (ISO 3146/ASTM D3418), Vicat Softening Point 48° C. (ASTM D1525/ISO 306).

F1: Ethylene bis stearamide, CAS-No. 110-30-5

F2: Silicone oil, 60,000 cSt, polydimethylsiloxane, CAS-No. 63148-62-9

F3: Thiosynergic heat stabilizer, 3,3'-thiodipropionic acid dioctadecylester, CAS-No. 693-36-7

F4: Phenolic primary antioxidant, octadecyl-3-(3,5-di-tert.butyl-4-hydroxyphenyl)-propionate, CAS-No. 2082-79-3

F5: Titanium dioxide CAS-No. 13463-67-7

The components A, B, C and D according to Table 1 and the afore-mentioned additives and processing aids F were compounded under the following conditions: Extruder Machine L/D: 30, diameter: 40 mm, co-rotating twin screw, manufacture: KraussMaffei Berstorff, Germany, die head and melt temp: 250° C., throughput: 50~60 kg/h.

The thermoplastic compositions were tested using the following methods:

Notched Charpy impact strength [kJ/m2]:
The notched Charpy impact strength is measured on test specimen (80×10×4 mm, injection molded at a mass temperature of 240° C. and a mold temperature of 70° C.), at 23° C. according to ISO 179-1A.

Notched Izod impact strength [kJ/m²]:
The notched Izod impact strength [kJ/m²] is measured on test specimen (80×10×4 mm, injection molded at a mass temperature of 240° C. and a mold temperature of 70° C.), at 23° C. according to ISO 180-1A.

Melt volume index (MVR [ml/10 min]):
The melt volume rate MVR is measured on a polymer melt at 220° C. and 10 kg load according to ISO 1133.

Tensile strain at break [%]:
The tensile strain at break [%] is measured on Dumbbell test specimen 170×10×4 mm (injection molded at a mass temperature of 240° C. and a mold temperature of 70° C.) at 23° C. according to DIN EN ISO 527.

ESCR method:
After compounding, the obtained thermoplastic compositions were injection molded into test bars with the dimension 80×10×4 mm under following conditions: Clamping force: 120 MT, manufacturer: Dongshing, Korea, injection temperature: 240° C., Injection speed: 60%, cycle time: 45 sec, mold temp: 60° C. The molded bars were tested in regard to their chemical resistance according to the following environmental stress crack resistance (ESCR) test:

Injection molded test bars (80×10×4 mm) are mounted on a jig which maintains constant curvature at 2.5% outer fiber strain. The jig with the test pieces is placed into a jar filled with the chemical agent in a way that the test bars are completely covered. During the experiment, the proceeding degradation is monitored and reviewed in dependence of time. After allowing the test pieces to stand in the prescribed environmental conditions for a specific period of time (in normal case 300 min or till complete crack) and removing them from the jig, the condition of physical degradation is checked.

The determination of chemical resistance was done optically in dependence of the following criteria: complete crack, partial crack, surface crack, edge crack, and surface quality after aging.

A summary (cp. Table 2) is then given by the following symbols: X: degraded ▲: highly affected ▲▲: affected ▲▲▲: a little affected ▲▲▲▲: not affected (▲): 0.5 ▲

Table 1 describes the components of the thermoplastic compositions.

To better compare different materials also a ranking (cp. Table 2) is given (1=material with highest chemical resistance of all tested materials, 2=material with second highest chemical resistance of all tested materials, etc.).

Common chemicals for testing like cyclopentane were applied at room temperature. In case of trans-1-chloro-3,3,3-trifluoropropene (b.p. 19° C.) the tests were done at 0° C. to prevent evaporation of the agent while maintaining constant test conditions.

By comparison of the thermoplastic compositions according to the inventive examples 1 and 2 to the thermoplastic compositions of comparative examples Cp. 1 and Cp. 2, known from the prior art, it is found that the thermoplastic molding compositions according to inventive examples 1 and 2 show superior ESCR behavior during the applied test. Inventive example 1 does not only show very good resistance against trans-1-chloro-3,3,3-trifluoropropene but also superior resistance against cyclopentane. This is important since manufacturers use mixtures of blowing agents for their applications in most cases.

The chemical resistance against both tested blowing agents of the thermoplastic composition according to inventive example 2 is extremely good.

Additionally, inventive examples 1 and 2 both show the favorable properties known for ABS materials; good processability (MVR, elongation at break) and toughness (impact strength).

TABLE 1

Thermoplastic compositions

| | | Composition | | | | | | | | | |
|---|---|---|---|---|---|---|---|---|---|---|---|
| | | graft ABS (A) | mABS (D) | Elvaloy (C) | SAN-copolymer (B) | | | Additives (F) | | | | |
| No. | Components | parts | parts | parts | parts | AN (IR, average) [%] | MVR 220/10 [cm³/10 min] (average) | F1 parts | F2 parts | F3 parts | F4 parts | F5 parts |
| Cp. 1 | (A) + (B) | 29 | | | 71 (9 B1 + 40 B3 + 22 B4) | 32 | 18.3 | 1 | 0.25 | 0.25 | 0.5 | 7.8 |
| 1 | (A) + (B) + (C) | 23 | | 10 | 67 (53 B1 + 14 B4) | 29 | 6.7 | 1 | 0.25 | 0.5 | 0.5 | 5.5 |
| Cp. 2 | (A) + (B) + (D) | 20 | 20 | | 60 (60 B5) | 31 | 4.1 | 3 | 0.2 | 0.5 | 0.5 | 5.5 |
| 2 | (A) + (B) + (C) + (D) | 20 | 10 | 10 | 60 (60 B5) | 31 | 4.1 | 3 | 0.2 | 0.5 | 0.5 | 5.5 |

TABLE 2

ESCR results and mechanical data

| | | Composition | | | | ESCR test results | | | | Mechanical data | | | |
|---|---|---|---|---|---|---|---|---|---|---|---|---|---|
| | | graft ABS (A) | mABS (D) | Elvaloy (C) | SAN-co-polymer (B) | Cyclopentane | | trans-1-chloro-3,3,3-trifluoropropene | | notched IZOD Impact | notched Charpy Impact | Elonga- | MVR (220° C., |
| No. | Components | parts | parts | parts | parts | chemical resistance | ranking | chemical resistance | ranking | strength [kJ/m²] | strength [kJ/m²] | tion at break [%] | 10 kg) [ml/10 min] |
| Cp. 1 | (A) + (B) | 29 | | | 71 | ▲▲▲(▲) | 2 | ▲▲ | 3 | 31.8 | 26.4 | 24.8 | 4.4 |
| 1 | (A) + (B) + (C) | 23 | | 10 | 67 | ▲▲▲▲ | 1 | ▲▲▲ | 2 | 35.2 | — | 50.0 | 5.0 |
| Cp. 2 | (A) + (B) + (D) | 20 | 20 | | 60 | ▲▲▲(▲) | 2 | ▲▲▲ | 2 | 37.4 | 26.7 | 53.1 | 5.0 |
| 2 | (A) + (B) + (C) + (D) | 20 | 10 | 10 | 60 | ▲▲▲▲ | 1 | ▲▲▲(▲) | 1 | 38.1 | 33.9 | 64.0 | 7.7 |

The invention claimed is:

1. A method in which a thermoplastic molding composition is formed into a shaped article requiring resistance to hydrofluoro olefins, wherein the thermoplastic molding composition comprises components A, B, C, and D:
(A) 10 to 35 wt.-% of at least one graft rubber copolymer A obtained by emulsion polymerization and built up from:
  ($a_1$) 30 to 90 wt.-%, based on (A), of at least one graft base ($a_1$) made from:
    ($a_{11}$) 70 to 98 wt.-%, based on ($a_1$), of at least one diene, and
    ($a_{12}$) 2 to 30 wt.-%, based on ($a_1$), of at least one monomer selected from the group consisting of styrene, α-methylstyrene, acrylonitrile, methacrylonitrile, and methyl methacrylate, and
  ($a_2$) 10 to 70 wt.-%, based on (A), of a graft ($a_2$), grafted onto the graft base and built up from:
    ($a_{21}$) 65 to 95 wt.-%, based on ($a_2$), of at least one vinylaromatic monomer,
    ($a_{22}$) 5 to 35 wt.-%, based on ($a_2$), of acrylonitrile and/or methacrylonitrile, and
    ($a_{23}$) 0 to 20 wt.-%, based on ($a_2$), of at least one monomer selected from the group consisting of $C_1$-$C_4$-alkyl(meth)acrylates, maleic anhydride, N-phenyl maleimide, N-cyclohexyl maleimide, and (meth)acrylamide;
(B) 50 to 75 wt.-% of at least one copolymer B made from:
  ($b_1$) 50 to 95 wt.-%, based on (B), of at least one vinylaromatic monomer,
  ($b_2$) 5 to 50 wt.-%, based on (B), of acrylonitrile and/or methacrylonitrile, and
  ($b_3$) 0 to 20 wt.-%, based on (B), of one or more of the monomers as described for ($a_{23}$);
(C) 4 to 20 wt.-% of at least one copolymer C made from:
  ($c_1$) 70 to 91 wt.-%, based on (C), of ethylene,
  ($c_2$) 9 to 30 wt.-%, based on (C), at least one $C_1$-$C_6$-alkyl(meth)acrylate, and
  ($c_3$) 0 to 15 wt.-%, based on (C), of at least one further comonomers copolymerizable with ($c_1$) and ($c_2$); and
(D) 4 to 20 wt.-% of at least one graft rubber copolymer D obtained by mass polymerization and built up from:
  ($d_1$) 10 to 25 wt.-%, based on (D), of at least one graft base ($d_1$) made from:
    ($d_{11}$) 75 to 100 wt.-%, based on ($d_1$), of at least one diene, and
    ($d_{12}$) 0 to 25 wt.-%, based on ($d_1$), of at least one vinylaromatic monomer, and
  ($d_2$) 75 to 90 wt.-%, based on (D), of a graft ($d_2$), grafted onto the graft base and built up from:
    ($d_{21}$) 68 to 82 wt.-%, based on ($d_2$), of at least one vinylaromatic monomer,
    ($d_{22}$) 18 to 32 wt.-%, based on ($d_2$), of acrylonitrile or methacrylonitrile, and ($d_{23}$) 0 to 20 wt.-%, based on ($d_2$), of one or more of the monomers as described for ($a_{23}$);
wherein the sum of components A, B, C, and D totals 100 wt.-%.

2. The method according to claim 1, wherein the thermoplastic molding composition further comprises 0.01 to 20 parts by weight of at least one further additive and/or processing aid F, based on 100 parts by weight of the composition consisting of components A, B, C, and D.

3. The method according to claim 1, wherein the thermoplastic molding composition further comprises 0.01 to 10 parts by weight of at least one inorganic additive E selected from phyllosilicates (E1) and nano calcium carbonate (E2), based on 100 parts by weight of the composition consisting of components A, B, C, and D.

4. The method according to claim 1, wherein the thermoplastic molding composition comprises components A, B, C, and D in the following amounts:
(A): 18 to 28 wt.-%;
(B): 55 to 70 wt.-%;
(C): 6 to 15 wt.-%; and
(D): 6 to 15 wt.-%.

5. The method according to claim 1, wherein graft rubber copolymer A is built up from:
($a_1$) 40 to 90 wt.-% of at least one graft base ($a_1$) made from:
($a_{11}$) 80 to 98 wt.-% of at least one diene ($a_{11}$), and
($a_{12}$) 2 to 20 wt.-% of at least one monomer ($a_{12}$), and
($a_2$) 10 to 60 wt.-% of a graft ($a_2$), grafted onto the graft base ($a_1$) and built up from:
($a_{21}$) 65 to 80 wt.-% of at least one vinylaromatic monomer ($a_{21}$),
($a_{22}$) 20 to 35 wt.-% of acrylonitrile and/or methacrylonitrile ($a_{22}$), and
($a_{23}$) 0 to 20 wt.-% of at least one monomer ($a_{23}$).

6. The method according to claim 1, wherein copolymer B is made from:
($b_1$) 60 to 82 wt.-% of styrene or α-methylstyrene, and
($b_2$) 18 to 40 wt.-% of acrylonitrile.

7. The method according to claim 1, wherein copolymer C has a weight average molar mass $M_w$ of less than 1,000,000 g/mol.

8. The method according to claim 1, wherein copolymer C has a MFR of from 0.5-50 [g/10 min] (190° C./2.16 kg load, according to ASTM D1238; ISO 1133-1:2011).

9. The method according to claim 1, wherein copolymer C is an ethylene methylacrylate copolymer.

10. The method according to claim 1, wherein graft copolymer D is built up from:
($d_1$) 12 to 20 wt.-% of a graft base ($d_1$) made from:
($d_{11}$) 75 to 100 wt.-% of 1,3-butadiene, and
($d_{12}$) 0 to 25 wt.-% of styrene, and
($d_2$) 80 to 88 wt.-% of a graft ($d_2$), grafted onto the graft base and built up from:
($d_{21}$) 68 to 82 wt.-%, based on ($d_2$), of styrene, and
($d_{22}$) 18 to 32 wt.-%, based on ($d_2$), of acrylonitrile.

11. The method according to claim 3, wherein component E1 is present in an amount of from 0.01 to 5 parts by weight, based on 100 parts by weight of the composition consisting of components A, B, C, and D.

12. The method according to claim 3, wherein component E2 is present in an amount of from 0.01 to 10 parts by weight, based on 100 parts by weight of the composition consisting of components A, B, C, and D.

13. The method according to claim 1, wherein the thermoplastic molding composition is formed into the shaped articles by extrusion or co-extrusion.

14. The method according to claim 1, wherein the shaped article is an inliner in cooling apparatuses.

15. A thermoplastic molding composition as defined in claim 1.

16. The thermoplastic molding composition according to claim 15, comprising components A, B, C, and D in the following amounts:
(A): 18 to 28 wt.-%;
(B): 55 to 70 wt.-%;
(C): 6 to 15 wt.-%; and
(D): 6 to 15 wt.-%.

* * * * *